(12) United States Patent
Knowles et al.

(10) Patent No.: US 6,751,351 B2
(45) Date of Patent: Jun. 15, 2004

(54) TEST QUESTION RESPONSE VERIFICATION SYSTEM

(75) Inventors: Kristian Knowles, Rotherham (GB); Robert Nicola Pascale, Templestowe (AU)

(73) Assignee: NSC Pearson, Inc., Minneapolis, MN (US)

(*) Notice: Subject to any disclaimer, the term of this patent is extended or adjusted under 35 U.S.C. 154(b) by 422 days.

(21) Appl. No.: 09/799,299

(22) Filed: Mar. 5, 2001

(65) Prior Publication Data

US 2002/0123028 A1 Sep. 5, 2002

(51) Int. Cl.⁷ .................. G06K 9/00; G09B 7/00; G06F 17/00
(52) U.S. Cl. .................. 382/181; 434/354; 434/324; 709/1
(58) Field of Search .................. 382/181, 173, 382/177; 434/324, 353, 354; 709/1

(56) References Cited

U.S. PATENT DOCUMENTS

| | | | |
|---|---|---|---|
| 3,405,457 A | 10/1968 | Bitzer | |
| 3,538,626 A | 11/1970 | Frank | |
| 3,762,072 A | 10/1973 | From | 35/48 |
| 3,932,948 A | 1/1976 | Goddard et al. | 35/9 |
| 4,004,354 A | 1/1977 | Yamauchi | 35/48 |
| 4,151,659 A | 5/1979 | Lien et al. | 35/35 |
| 4,205,780 A | 6/1980 | Burns et al. | 235/454 |
| 4,478,584 A | 10/1984 | Kaney | 434/353 |
| 4,518,267 A | 5/1985 | Hepp | 368/107 |
| 4,518,361 A | 5/1985 | Conway | 434/307 |
| 4,553,261 A | 11/1985 | Froessl | 382/57 |
| 4,627,818 A | 12/1986 | Von Fellenberg | 434/236 |
| 4,648,062 A | 3/1987 | Johnson et al. | 364/900 |
| 4,671,772 A | 6/1987 | Slade et al. | 434/219 |
| 4,694,352 A | 9/1987 | Ina et al. | 358/257 |
| 4,705,479 A | 11/1987 | Maron | 434/335 |
| 4,708,503 A | 11/1987 | Poor | 400/531 |
| 4,715,818 A | 12/1987 | Shapiro et al. | 434/118 |
| 4,741,047 A | 4/1988 | Sharpe, II | 382/56 |
| 4,760,246 A | 7/1988 | Shepard | 235/454 |
| 4,764,120 A | 8/1988 | Griffin et al. | 434/336 |
| 4,798,543 A | 1/1989 | Spiece | 434/323 |
| 4,845,739 A | 7/1989 | Katz | 379/92 |
| 4,867,685 A | 9/1989 | Brush et al. | 434/234 |
| 4,878,175 A | 10/1989 | Norden-Paul et al. | 364/413.01 |
| 4,895,518 A | 1/1990 | Arnold et al. | 434/118 |
| 4,908,759 A | 3/1990 | Alexander, Jr. et al. | 364/300 |
| 4,930,077 A | 5/1990 | Fan | 364/419 |
| 4,937,439 A | 6/1990 | Wanninger et al. | 235/456 |
| 4,958,284 A | 9/1990 | Bishop et al. | 364/419 |
| 4,978,305 A | 12/1990 | Kraft | 434/253 |
| 4,996,642 A | 2/1991 | Hey | 364/419 |
| 5,002,491 A | 3/1991 | Abrahamson et al. | 434/322 |
| 5,003,613 A | 3/1991 | Lovelady et al. | 382/17 |
| 5,011,413 A | 4/1991 | Ferris et al. | 434/358 |
| 5,023,435 A | 6/1991 | Deniger | 235/375 |
| 5,035,625 A | 7/1991 | Munson et al. | 434/332 |
| 5,038,392 A | 8/1991 | Morris et al. | 382/61 |
| 5,054,096 A | 10/1991 | Beizer | 382/41 |

(List continued on next page.)

FOREIGN PATENT DOCUMENTS

| | | |
|---|---|---|
| BE | 1000649 A6 | 2/1989 |
| EP | 0 171 663 A2 | 2/1986 |

(List continued on next page.)

OTHER PUBLICATIONS

U.S. patent application Ser. No. 09/799,376; Filed: Mar. 5, 2001.

(List continued on next page.)

*Primary Examiner*—Daniel Mariam
*Assistant Examiner*—Shefali Patel
(74) *Attorney, Agent, or Firm*—Merchant & Gould P.C.

(57) ABSTRACT

The present invention relates to a system and method for verifying and editing optically imaged responses received from a response provider.

23 Claims, 14 Drawing Sheets

U.S. PATENT DOCUMENTS

| | | | |
|---|---|---|---|
| 5,058,185 A | 10/1991 | Morris et al. | 382/41 |
| 5,059,127 A | 10/1991 | Lewis et al. | 382/353 |
| 5,072,383 A | 12/1991 | Brimm et al. | 364/413.02 |
| 5,086,385 A | 2/1992 | Launey et al. | 364/188 |
| 5,100,329 A | 3/1992 | Deesen et al. | 434/327 |
| 5,101,447 A | 3/1992 | Sokoloff et al. | 382/61 |
| 5,103,490 A | 4/1992 | McMillin | 382/62 |
| 5,105,354 A | 4/1992 | Nishimura | 364/413.02 |
| 5,119,433 A | 6/1992 | Will | 382/7 |
| 5,134,669 A | 7/1992 | Keogh et al. | 382/61 |
| 5,140,650 A | 8/1992 | Casey et al. | 382/61 |
| 5,147,205 A | 9/1992 | Gross et al. | 434/169 |
| 5,151,948 A | 9/1992 | Lyke et al. | 382/7 |
| 5,176,520 A | 1/1993 | Hamilton | 434/350 |
| 5,180,309 A | 1/1993 | Egnor | 434/323 |
| 5,195,033 A | 3/1993 | Samph et al. | 364/419 |
| 5,204,813 A | 4/1993 | Samph et al. | 364/419 |
| 5,211,564 A | 5/1993 | Martinez et al. | 434/323 |
| 5,258,855 A | 11/1993 | Lech et al. | 358/462 |
| 5,259,766 A | 11/1993 | Sack et al. | 434/362 |
| 5,261,823 A | 11/1993 | Kurokawa | 434/323 |
| RE34,476 E | 12/1993 | Norwood | 382/13 |
| 5,267,865 A | 12/1993 | Lee et al. | 434/350 |
| 5,294,229 A | 3/1994 | Hartzell et al. | 434/336 |
| 5,302,132 A | 4/1994 | Corder | 434/156 |
| 5,310,349 A | 5/1994 | Daniels et al. | 434/350 |
| 5,318,450 A | 6/1994 | Carver | 434/336 |
| 5,321,611 A | 6/1994 | Clark et al. | 364/419.2 |
| 5,344,132 A | 9/1994 | LeBrun et al. | 271/35 |
| 5,376,007 A | 12/1994 | Zirm | 434/262 |
| 5,379,213 A | 1/1995 | Derks | 364/411 |
| 5,387,104 A | 2/1995 | Corder | 434/156 |
| 5,416,312 A | 5/1995 | Lamoure | 235/494 |
| 5,418,865 A | 5/1995 | Bloomberg | 382/312 |
| 5,433,615 A | 7/1995 | Clark | 434/322 |
| 5,437,554 A | 8/1995 | Clark et al. | 434/322 |
| 5,452,379 A | 9/1995 | Poor | 382/317 |
| 5,458,493 A | 10/1995 | Clark et al. | 434/322 |
| 5,466,159 A | 11/1995 | Clark et al. | 434/322 |
| 5,496,175 A | 3/1996 | Oyama et al. | 434/118 |
| 5,544,255 A | 8/1996 | Smithies et al. | 382/119 |
| 5,558,521 A | 9/1996 | Clark et al. | 434/322 |
| 5,565,316 A | 10/1996 | Kershaw et al. | 434/322 |
| 5,596,698 A | 1/1997 | Morgan | 395/339 |
| 5,634,101 A | 5/1997 | Blau | 395/210 |
| 5,647,017 A | 7/1997 | Smithies et al. | 382/119 |
| 5,672,060 A | 9/1997 | Poor | 434/322 |
| 5,690,497 A | 11/1997 | Clark et al. | 434/322 |
| 5,709,551 A | 1/1998 | Clark et al. | 434/322 |
| 5,716,213 A | 2/1998 | Clark et al. | 434/322 |
| 5,718,591 A | 2/1998 | Clark et al. | 434/322 |
| 5,735,694 A | 4/1998 | Clark et al. | 434/322 |
| 5,752,836 A | 5/1998 | Clark et al. | 434/322 |
| 5,775,918 A | 7/1998 | Yanagida et al. | 434/353 |
| 5,915,973 A | 6/1999 | Hoehn-Saric et al. | 434/350 |
| 5,987,149 A | 11/1999 | Poor | 382/100 |
| 5,987,302 A | 11/1999 | Driscoll et al. | 434/353 |
| 5,991,595 A | 11/1999 | Romano et al. | 434/353 |
| 6,112,049 A | 8/2000 | Sonnenfeld | 434/350 |
| 6,120,299 A | 9/2000 | Trenholm et al. | 434/323 |
| 6,146,148 A | 11/2000 | Stuppy | 434/322 |
| 6,173,154 B1 | 1/2001 | Kucinski et al. | 434/359 |
| 6,181,909 B1 | 1/2001 | Burstein et al. | 434/353 |
| 6,234,806 B1 | 5/2001 | Trenholm et al. | 434/322 |
| 6,267,601 B1 | 7/2001 | Jongsma et al. | 434/323 |
| 6,295,439 B1 | 9/2001 | Bejar et al. | 434/350 |
| 6,366,760 B1 | 4/2002 | Kucinski et al. | 434/359 |
| 6,418,298 B1 | 7/2002 | Sonnenfeld | 434/350 |
| 6,558,166 B1 | 5/2003 | Clark | 434/322 |
| 2002/0110797 A1 | 8/2002 | Poor | 434/353 |

FOREIGN PATENT DOCUMENTS

| | | |
|---|---|---|
| GB | 2 274 932 A | 8/1994 |
| JP | 56-10634 | 1/1978 |
| JP | 3-1709 | 5/1984 |
| JP | 5-74825 | 2/1987 |
| JP | 62-75578 | 4/1987 |
| JP | HEI 4(1992)-147288 | 5/1992 |
| WO | WO 90/05970 | 5/1990 |
| WO | WO 99/06930 | 2/1999 |

OTHER PUBLICATIONS

U.S. patent application Ser. No. 09/799,212; Filed: Mar. 5, 2001.

U.S. patent application Ser. No. 09/799,406; Filed: Mar. 5, 2001.

U.S. patent application Ser. No. 09/799,209; Filed: Mar. 5, 2001.

Breland, H. et al., "Remote Scoring of Essays", *College Board Report*, No. 88–3, ETS RR No. 88–4, 43 pages (1988).

Brown, P. et al., "Validation—Cost Effective External Evaluation", *Australian Journal of Educational Technology*, vol. 6, NO. 2, pp. 92–98 (1990).

Draper, S. et al., "Integrative Evaluation: An Emerging Role for Classroom Studies of CAL", http://www.psy.gla.ac.uk/steve/IE.html, 17 pages (Aug. 12, 1995).

Draper, S., "Observing, Measuring, or Evaluating Courseware", http://www.psy.gla.ac.uk/~steve/Eval.HE.html, 10 pages (Feb. 18, 1996).

Foxon, M. et al., "Evaluation of Training and Development Programs: A Review of the Literature", *Australian Journal of Educational Technology*, vol. 5, No. 2, pp. 89–104 (1989).

Gathy, P. et al., "Computer–Assisted Self–Assessment (CASA) in Histology", *Computers & Education*, vol. 17, No. 2, pp. 109–116 (1991).

IBM Education Local Area Network and Tools (EdLAN): Tools for Education, 16 pages (1991).

IBM Multimedia Supplement to T.H.E. Journal, Special Issue, 41 pages (Sep. 1991).

IBM Personal Science Laboratory (PSL), IBM Tools For Education, 12 pages (1990).

IBM PS/2® MultiMedia for Microscopic Sudies, 4 pages (1991).

IBM Software for Education Catolog, Pre–Kindergarten to Adult Tools for Education, 86 pages, 1991/92 Edition.

"Image Processing of Open–Ended Questions", Uniscore, Incorporated, 3 pages (1992).

Kool, L., "The Scribophone: a graphic telecommunication system", *Philips Telecommunications Revie*, vol. 38, No. 1, 11 pages (Jan. 1980).

"Score Image Processing of Constructed–Response, Essays, and Writing Samples", Uniscore, Incorporated, 3 pages (1992).

Sims, R., "Futures for Computer–Based Training: Developing the Learner–Computer Interface", *Australian Journal of Educational Technology*, vol. 4, No. 2, pp. 123–136 (1988).

Uniscore Proposal No. 92–11, to Delaware Department of Public Instruction (May 15, 1992).

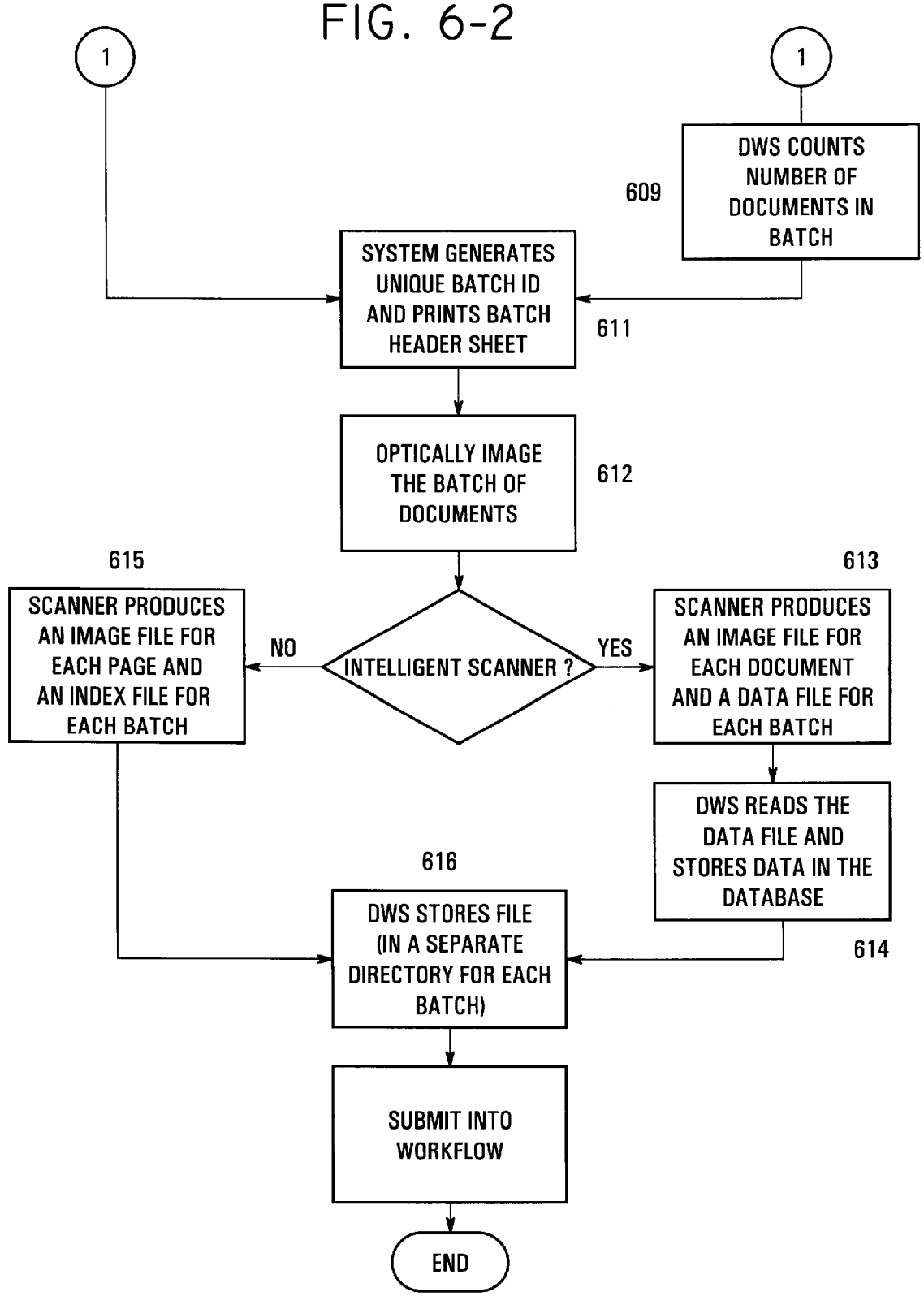

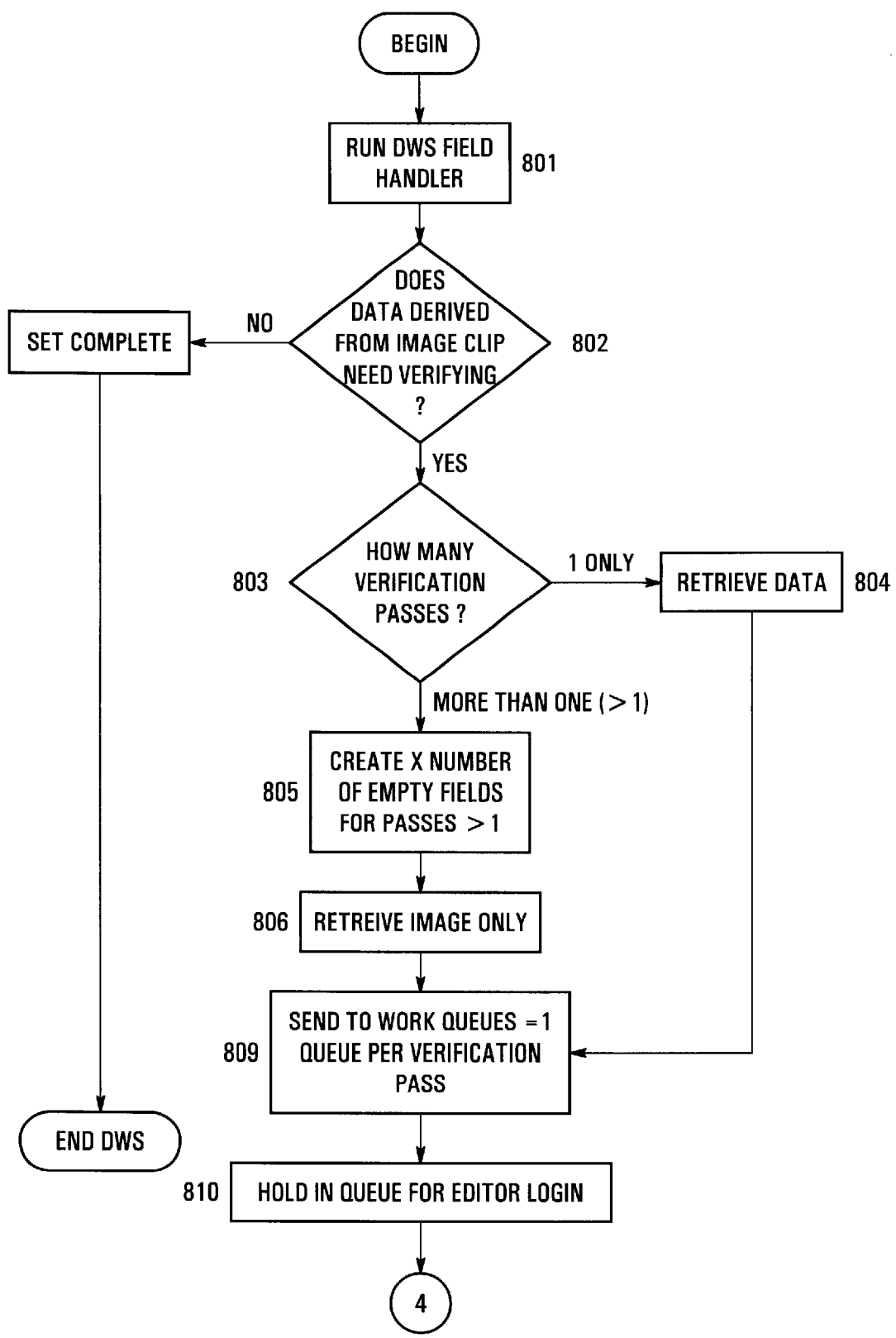

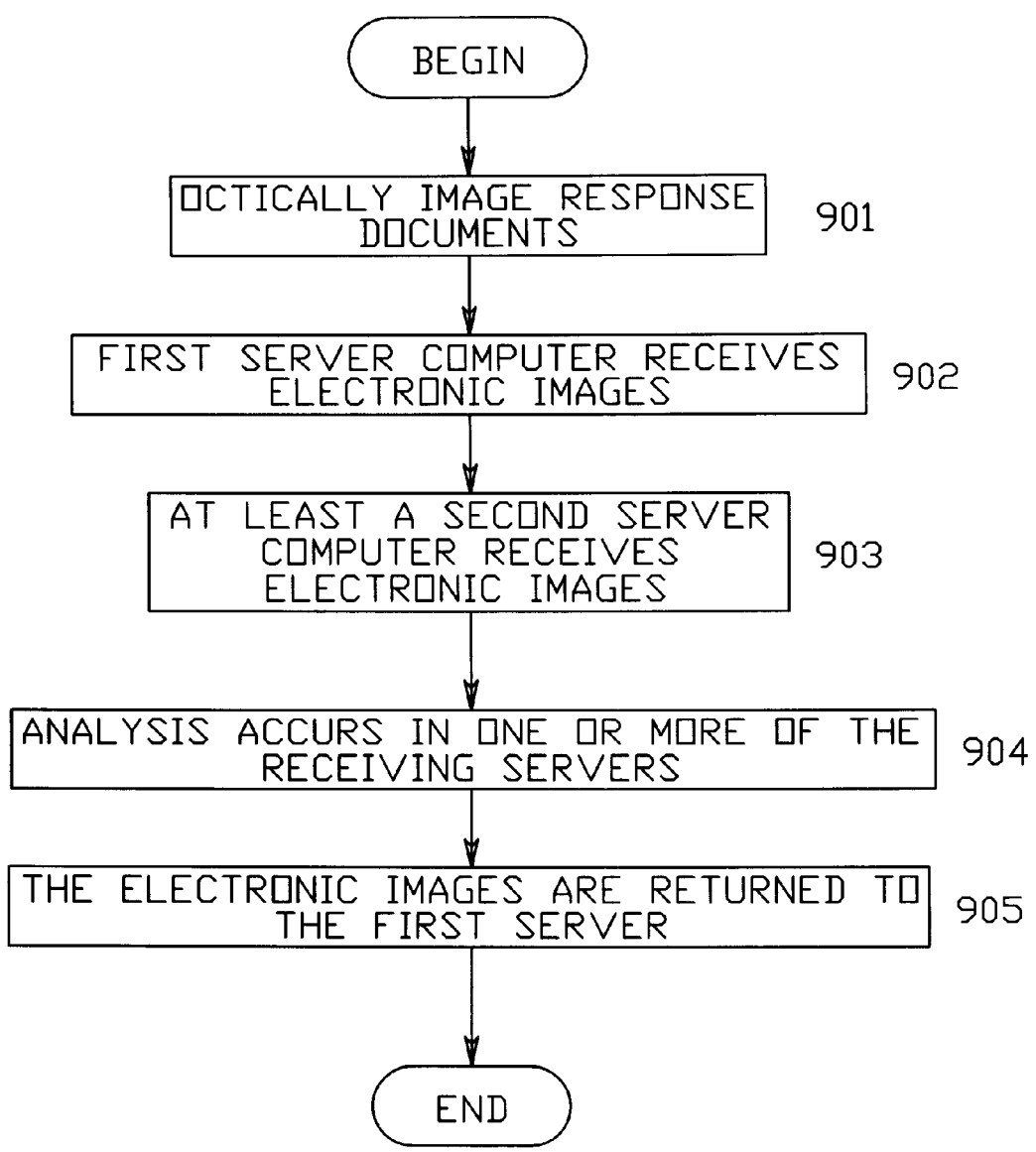

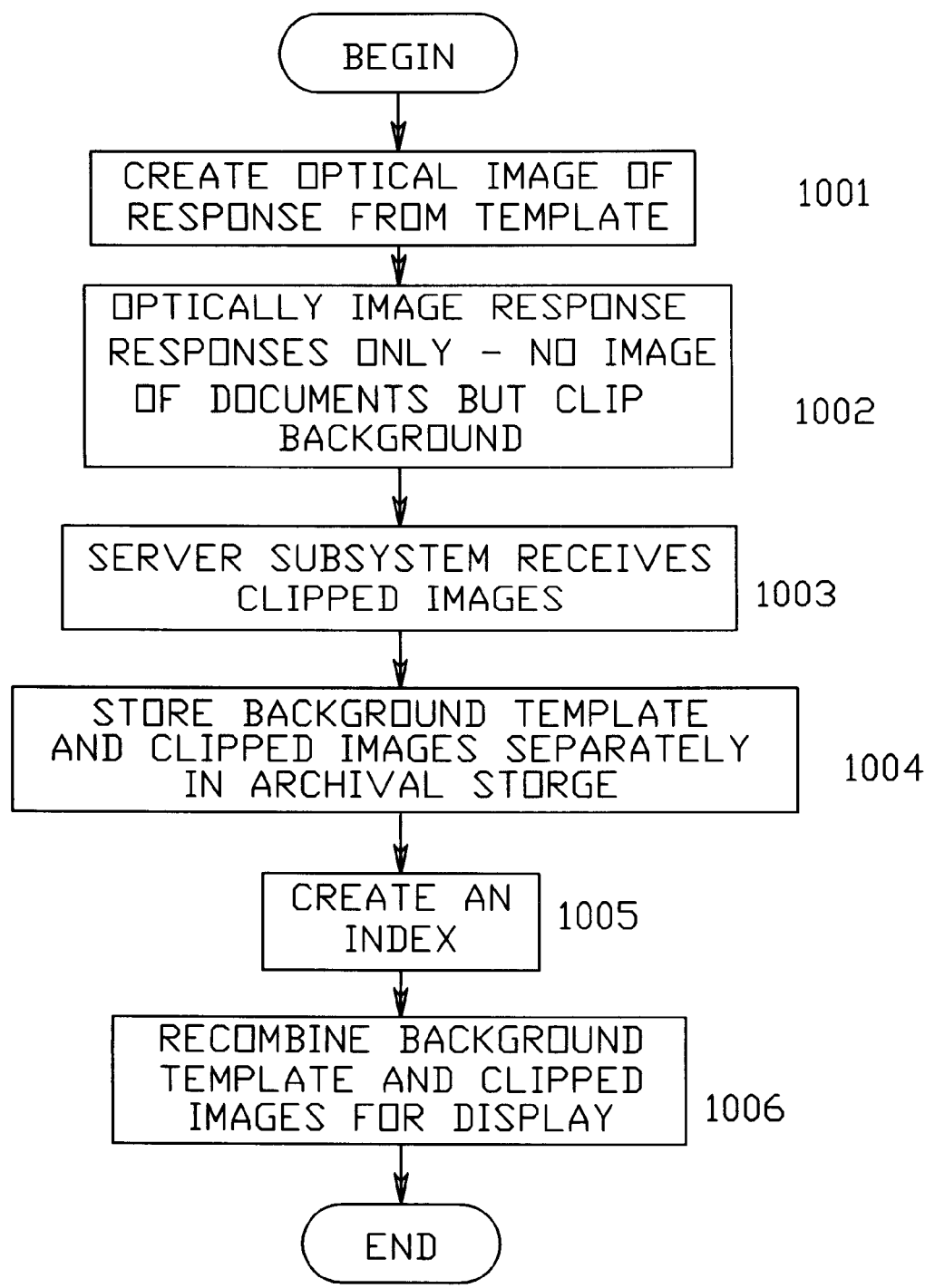

TEST QUESTION RESPONSE VERIFICATION SYSTEM

FIELD OF THE INVENTION

The present invention relates to a system and method for verifying and editing optically imaged responses received from a response provider.

BACKGROUND OF THE INVENTION

The scoring of test question responses that cannot be scored by machine is typically carried out manually or by presentation on a computer monitor. Manual scoring involves a human manually scoring a physical test question response sheet. Scoring by presentation to a human of the test question responses using a computer involves scoring an electronic representation of test question response or responses presented to a scorer via a computer monitor or other machine that can be programmed to manipulate symbols. It is the latter scoring procedure to which the present invention relates.

In order to present a test question response to a scorer viewing a computer monitor, several preparation steps typically occur to enable the scorer to receive the test question response, view it, score it and record the score with the necessary precision, speed and accuracy required in the test scoring industry. With test processing that analyzes optically imaged test question responses, scanners, facsimile machines and other optical imaging devices known to those skilled in the art are used to create an electronic image of the test question response that was provided by a test taker. The electronic images may be broken down into smaller images generally referred to as image clips. The electronic images and image clips may be stored in a computer or other storage media known to those skilled in the art. The electronic images and image clips are typically extracted to data using well known and commercially available optical character recognition software, image character recognition software and other similar computer programs. The data can then be utilized in a number of ways to aid the test scoring process.

While character recognition software programs have improved greatly, a need still exists to verify the results of the image conversion. Verification is especially important in the test scoring industry where test takers' scores may depend on the accuracy of the data extracted from the electronic images of the test question responses. Most character recognition software programs provide an automatic verification process performed electronically; however, even those results often are subject to a relatively high rate of error. In many situations, human editors use computer monitors at remotely-located geographic locations to verify the accuracy of the data extracted from the electronic images. A workflow system may be utilized to present to the editors data or images, or both, from which they are to verify accuracy.

Several problems using human editors to verify converted images have been identified. Editors often lack particular skills desired to analyze all types of data that may have been extracted from images. For example, if the test taker used Chinese characters to indicate his/her test question responses, editors not fluent in Chinese would find it difficult to analyze the information presented to them. Similarly, editors not comfortable with the numerous and complex symbols used on math tests may find it difficult to analyze the math test question responses presented to them.

The slow speed at which editors typically have analyzed the data extracted from images has also been a problem. Editors were randomly presented with data and/or images in need of analysis. For instance, an editor might be first presented with the image or the image and data of the test taker's first name. Rather than presenting a last name or middle initial to the editor next, the editor might be presented with the image or the image and data of a math test question response. The random nature of the materials presented to editors slowed their process in verifying the data extracted.

SUMMARY OF THE INVENTION

The present distributed test processing workflow system facilitates accurate, consistent and high quality image capture, conversion to data and verification of test question responses provided by a test taker.

The present verification editing method divides test question response images into smaller images or "image clips" for conversion to data using well known image recognition software. In the method, it is determined whether the particular data obtained from the image clips requires verification. If verification is required, information related to each image clip is processed against particular appropriate skills of human editors in order to select human editors having particular appropriate skills. Selected image clips are then recompiled into coherent image portions of the test question response and selectively presented, with or without corresponding data, to the human editor for analysis. Finally, the decisions of the human editor are electronically recorded.

BRIEF DESCRIPTION OF THE DRAWINGS

FIGS. 8, 8A, 8B is a flow chart of one embodiment of the verification invention.

FIG. 9 is a flow chart of one embodiment of the multiple server response processing invention.

FIG. 10 is a flow chart of one embodiment of the image archive invention.

DETAILED DESCRIPTION OF THE PREFERRED EMBODIMENTS

General Overview

Figure 1:
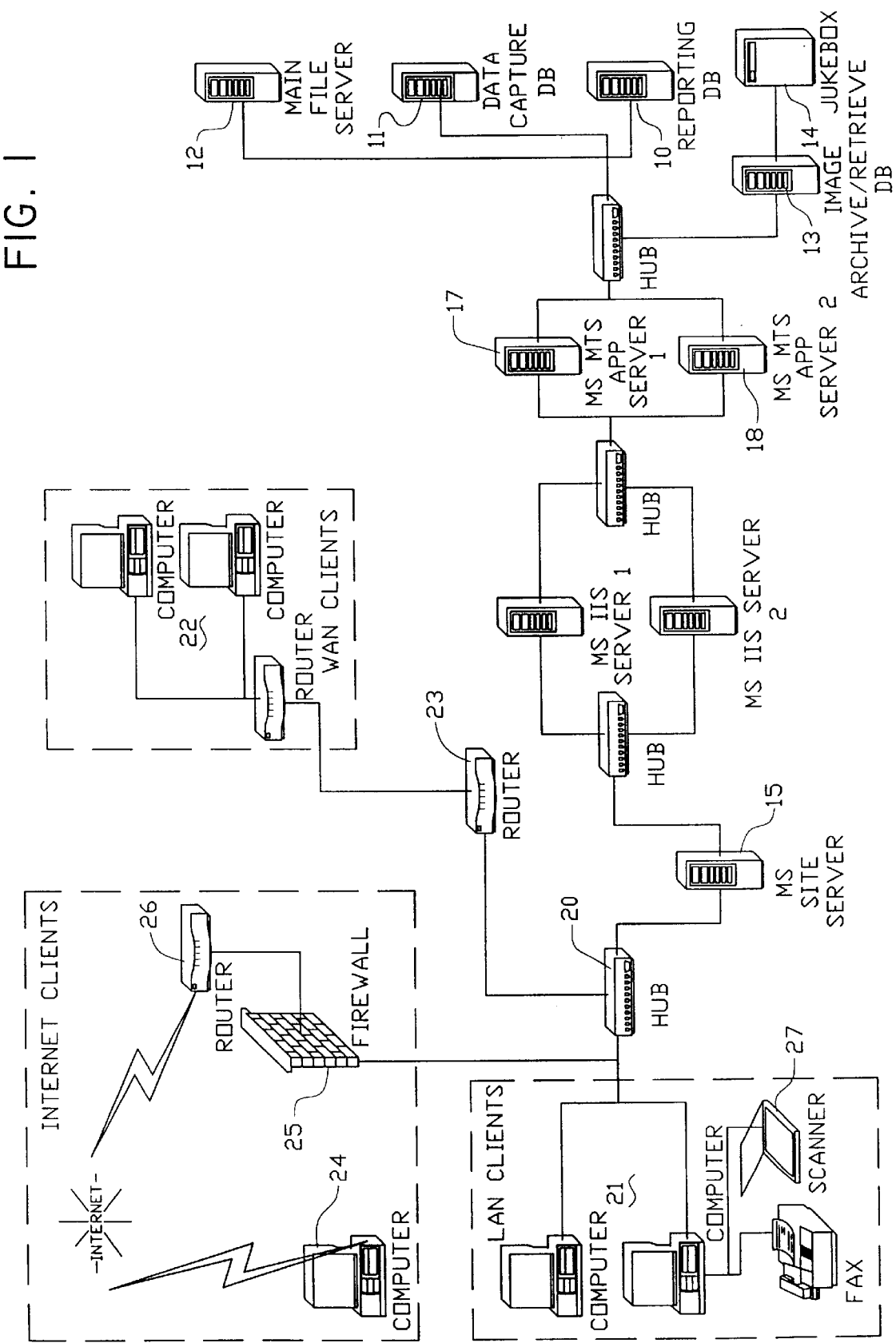
FIG. 1 is a hardware diagram of a distributed workflow system as possible using the claimed inventions.

The present invention pertains to a response document processing workflow system. Response document processing is often employed in the test grading and survey analysis industries. By way of explanation, but not limitation, a need has developed in the response document processing industry to process more documents, faster, with better accuracy and less expensively than ever before. Electronic imaging has become very popular in the response document processing industry given the flexibility, speed and efficiency gained through the use of electronic images over paper documents. Scanners are one popular type of optical imaging device; another is the facsimile machine. The increased volume of documents to be processed, and the quicker turn-around time, requires the combination of multiple scanners, multiple processing units and multiple operator stations working in parallel or in series to quickly finish a processing job. A network is often employed to couple the various hardware components. The networked response processing workflow system described below satisfies the above described needs.

The beginning of a response processing project or "job" may occur well before the documents containing the responses are received at a response processing center. For example, customer or respondent information such as name, mailing address, identification number, and other personalized information may be printed onto response forms, such as test forms or survey forms. The personalized forms may then be provided to a customer or directly to a response provider with or without a personalized cover letter. The above is accomplished by populating and maintaining a database or other electronic storage system with personalized information necessary for personalization of the response forms.

Whether the response documents received at the response processing center are those that were personalized or not, it is critical that all documents received are processed and accounted for. An audit trail is therefore started at document receipt time. The processing center will collect the documents in pre-selected quantities or batches. A batch header document containing a unique bar-code batch number or other similar machine readable identifier will be assigned to each batch of documents.

The documents will be optically imaged at the processing center in one batch or subdivided into smaller batches and imaged sequentially. Multiple processing centers may be used to meet customer needs. While scanning is the preferred method of optical imaging, facsimile and other optical imaging devices known to those skilled in the art may be used to create an electronic image. After imaging, the physical documents typically are stored in a warehouse, their location identified through the unique bar-code batch number or other machine readable identifier on the batch header.

Several steps may be required prior to collection of data from the electronic image taken from each document. For example, image enhancement and image identification are available applications that may be implemented prior to data collection. Data collection or recognition is accomplished using one or more recognition technologies, for which an interface is provided in the system. The system must be flexible enough to handle responses in many different languages and disciplines. Because accuracy is critical in testing and response imaging, human verification may be applied to any data derived from electronic images that is invalid or uncertain. The customer may require multiple verification. In such a case, if the system detects a discrepancy between the values of the verified data, the image and the data values are automatically sent to a third adjudicator for resolution (adjudication). In an alternative embodiment, a double adjudication embodiment, the data values are automatically sent to a third and fourth adjudicator for resolution. If the adjudicators disagree, the image is sent to a manager or other NCS official for final determination.

After the data has been verified, it may be sent to other systems for processing consistent with tests, such as grading; surveys, such as tallying; or other processes known to those skilled in the art.

Although electronic storage capabilities have helped lower operating costs, the need remains to minimize the cost of storing electronic images. An image archive component of the workflow system is provided. It can be appreciated that the archives will play an important role in the event that a dispute arises over the accuracy of data from an imaged response or test. Further, imaged archives can be accessed by customers wanting to view the original scanned document for any number of reasons.

Hardware Overview

FIG. 1 illustrates an example of a hardware configuration for the present response document processing system. This configuration is shown as an example only; many different hardware configurations are available for implementing the response processing functions described below, and others will become available as hardware technology advances, as recognized by those skilled in the art. The network shown is generally described as a three tier or three layer architecture, (See FIG. 1A for more detail on three tier architecture) including a bottom tier or data layer of at least one server computer. The data layer may include a server subsystem including several servers as shown in FIG. 1 at 10-13. Separate servers may be used for such tasks as maintaining a report database 10, a data capture database 11, a local area network server 12, archived images database 13 and a "jukebox" 14—a hardware mechanism for allowing access to one of a group of discs, especially CD-ROMs or other storage media. The data layer of the hardware system is interfaced with a middle tier or business objects layer.

The business objects layer provides process management where business logic and rules are executed and can accommodate hundreds of users (as compared to only 100 users with a two tier architecture—also usable in the present system) by providing functions such as queuing, application execution, and database staging. In FIG. 1 the business objects layer includes a site server 15 interfaced through a hub computer and a site server 16 to application servers 17 and 18. The application servers in the preferred embodiment utilize Microsoft's Transactional Server software. The business objects layer interfaces through hub computer 20 to a presentation layer or top tier. The presentation layer of the preferred embodiment includes computers 21 interfaced to the system via a local area network or LAN, a computer 22 and a router 23 interfaced to the system via a wide area network or WAN and a computer 24 interfaced to the system via the Internet or other global computer network. The internet connection also includes a firewall 25 and router 26. The optical imaging devices 27 (a scanner and facsimile machine) are shown in this embodiment coupled to client computers 21. In an alternative embodiment, the optical imaging devices shown, a scanner or facsimile machine 27 may be coupled with computers 22 or computer 24.

The system uses the optical imaging devices 27, usually scanners, in the presentation layer to optically image responses provided by respondents on questionnaires, surveys, tests or other similar response documents on which responses are received. Theses response documents may comprise, for example, test forms with "bubbles" or ovals representing possible answers to test questions, handwritten essays, survey responses, or other various types of written or printed or marked information provided by the respondent.

After receiving the optically imaged responses, the system can prepare those electronic images for subsequent processing, such as test grading or survey analysis. A response item is, therefore, an electronic representation of at least a portion of a questionnaire, legal document or response document, including, but not limited to, a test form with answers, a contract or a survey. The system and methods described below are then employed to process the response items such that they are prepared for subsequent online analysis. See, for example, U.S. Pat. Nos. 5,752,836; 5,735,694; 5718,591; 5,716,213; 5,709,551; 5,690,497; 5,321,611; 5,458,493; 5,433,615; 5,437,554; 5,466,159; 5,452,379; 5,672,060; 5,987,149; and 5,558,521 describing online training, scoring, teaching and reporting systems and methods. See also, U.S. Pat. Nos. 5,711,673; 5,420,407; 5,262,943; 5,262,624; 5,184,003; 5,134,669; 5,086,215; 4,934,684; 4,857,715; and 4,217,487. The patents listed above, specifically their specifications and drawings, are incorporated herein by reference to further supplement and explain the present invention.

The system must be capable of supporting various types of optical imaging devices, such as intelligent scanners like the NCS 5000i and non-intelligent scanners that utilize the Kofax/ISIS/TWAIN interface. The client subsystem computers 21, 22 and 24 typically initially receive the response items and may distribute them to the business objects layer server subsystem before sending them to the data layer server subsystem for storage, archival or other processing. For example, a response document optically imaged by the scanner 27 will be assigned a unique file name and digital identifier at the client subsystem computers 21, 22 or 24, then sent via the business objects layer server subsystem to the data layer server subsystem for storage and further processing using the system and methods described below. It is also possible for servers 10-13 to transfer the response items via a global, local or other network known to those skilled in the art to another server subsystem in a remote location. The ability to share the response items with another server subsystem makes work sharing and efficient use of resources available and practical. The servers may be in the same physical area as one another or separated by great distances, such as between different countries or continents. For example, the advantages of different time zones can be utilized using multiple servers and work sharing so as to avoid down time and delay in processing the customer's project.

Figure 2:
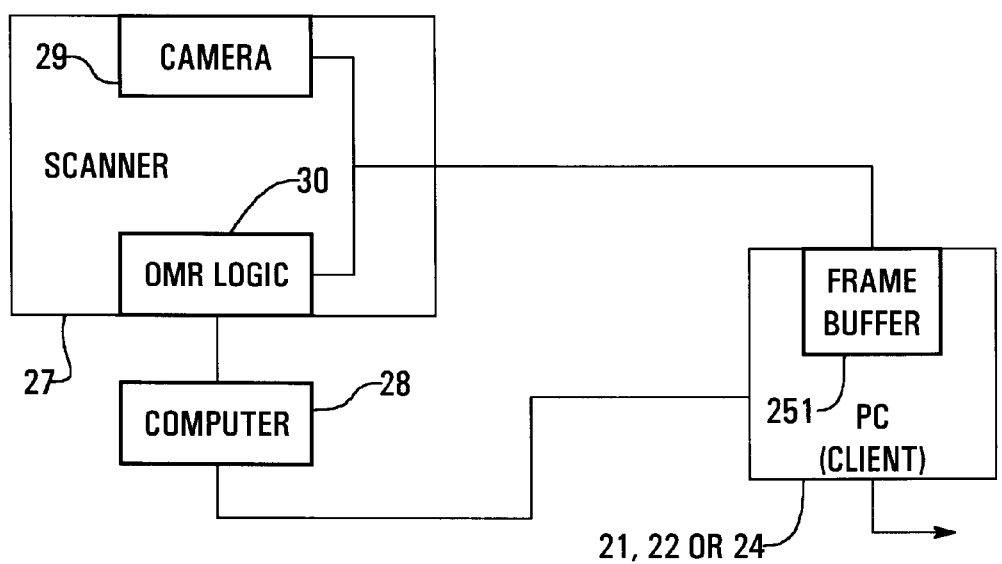
FIG. 2 is a block diagram of a portion of the network shown in FIG. 1.

FIG. 2 is a more detailed block diagram of a portion of the network shown in FIG. 1. As shown in FIG. 2, the optical imaging device 27 shown in FIG. 1, is typically a scanner 27 interfaced to a computer 28 or client subsystem computers 21, 22 or 24. The scanner 27 contains a camera 29 for reading through optically imaging all or portions of a response document. For example, using "clipping" to read individual responses on a response documents or reading all the responses including all or some of the document background of the response document (full page imaging).

Figure 3:
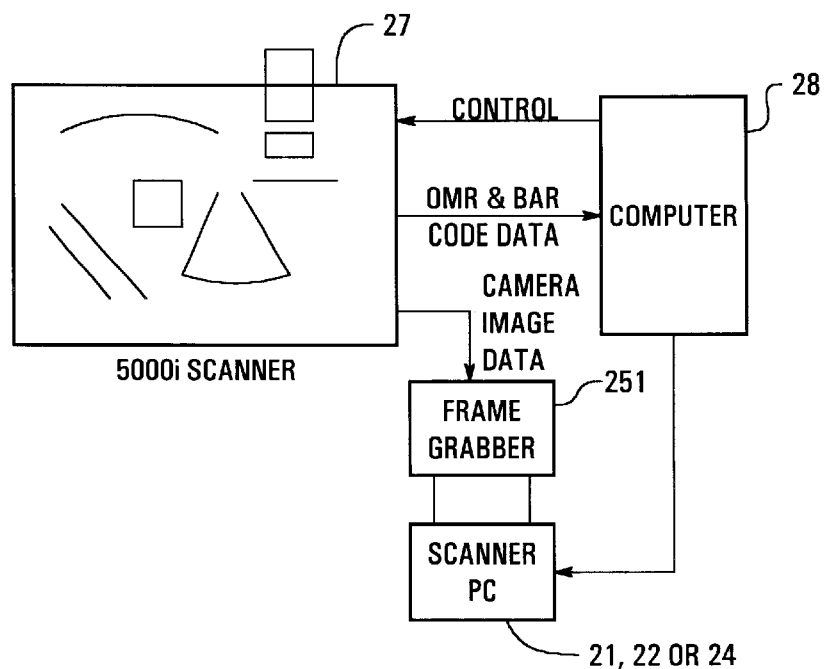
FIG. 3 is a block diagram of the scanning configuration in the network of FIG. 1.

FIG. 3 shows a more detailed block diagram of a typical scanning unit. Some scanners have camera optics and filter configurations that are optically "blind" to certain colors, typically called drop-out colors. As the scanner cannot see these colors and normally these colors constitute the response form background or template that the scanner will not capture the background of the form within the electronic image.

One or more client computers 21, 22 or 24, preferably implemented with the most current high performance computer chip and memory, usually contain a frame buffer 251 for receiving the scanned image data from the scanner 27. The computer 28, which is optional, is typically interfaced to the scanner 27 and client computers 21, 22 or 24 for controlling the operation of the optical imaging device, in this case the scanner 27. The system may alternatively be configured such that all of the functionality of the computer 28 is with client computers 21, 22 or 24. The computer 28, if used, controls the scanner and thus controls when image data is scanned in and subsequently transferred to client computers 21, 22 or 24. The client computers essentially act as a buffer for temporarily holding the image data. The client computers can also "clip" areas of interest from the electronic image. Clipping involves electronically removing, typically in software, a portion of the response item or scanned image. These clipped areas may comprise any portion of a response item: e.g., a handwritten essay or selected response positions. For example, if scanner 27 is an intelligent scanner such as the NCS 5000i, "clipping" of an area of interest from the image during scan time and representing at least a portion of the scanned response is possible. Examples of two systems for storing and extracting information from scanned images of test answer sheets are shown in U.S. Pat. Nos. 5,134,669 and 5,103,490, both of which are assigned to National Computer Systems, Inc. and are incorporated herein by reference as if fully set forth.

Figure 4:
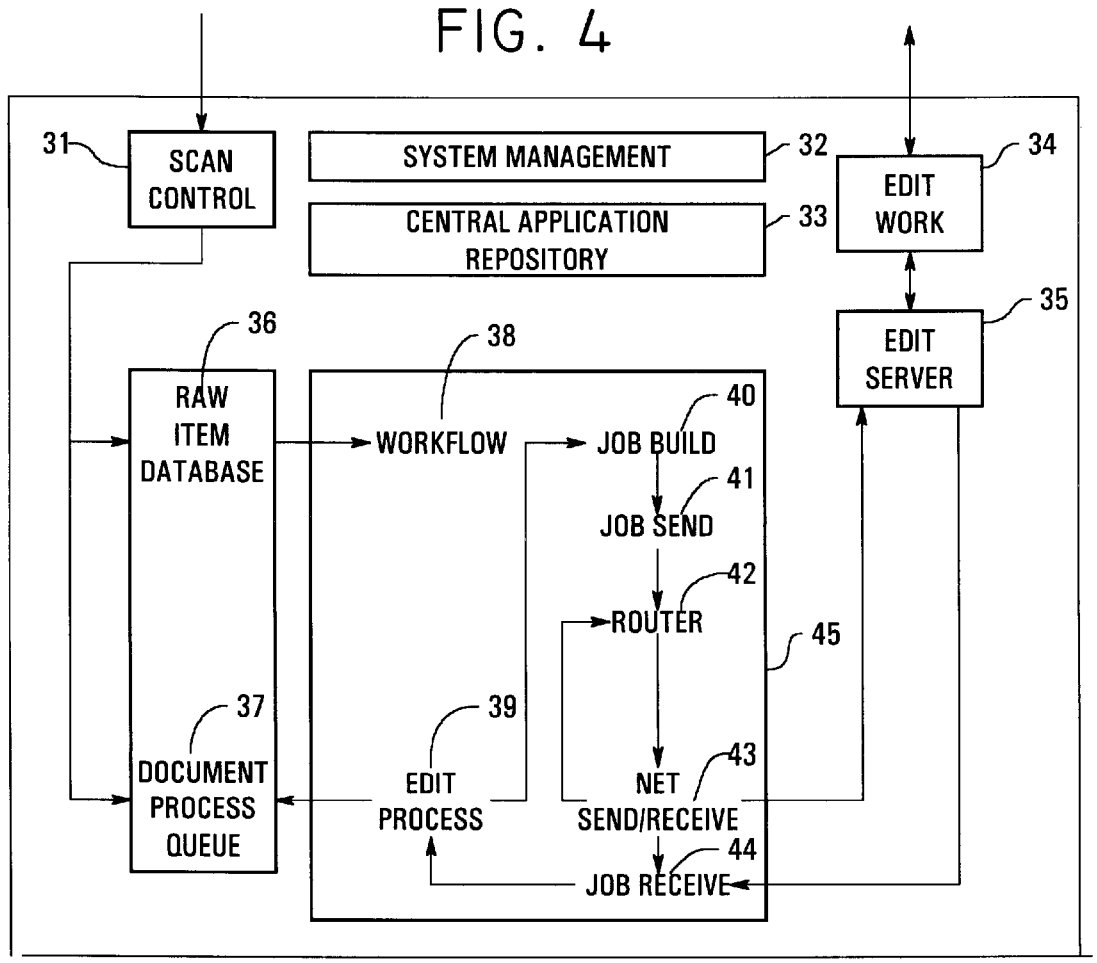
FIG. 4 is a block diagram of a portion of the network of FIG. 1.

FIG. 4 is a block diagram of the hardware and software functions in a server in the network of FIG. 1. A scan control module 31 interfaces with client computers 21, 22 or 24 and receives the image data. The image data is stored in a raw item database 36. For example, a SQL compliant industry standard relational database such as Microsoft SQL Server, may be used. The system typically further utilizes open systems architecture such as ODBC, to provide the database access mechanism. In an alternative embodiment, an entry level database is utilized thus removing the cost of a database such as Microsoft SQL Server. The central application repository (CAR) 33 typically stores document definitions and handling criteria. The document process queue 37 function as a buffer into a main processing module 45 preferably in servers 10-13. The main processing module 45 controls the processing of response items. It controls the transmission of response items to client computers 21, 22 and 24.

Software Overview

Figure 1A:
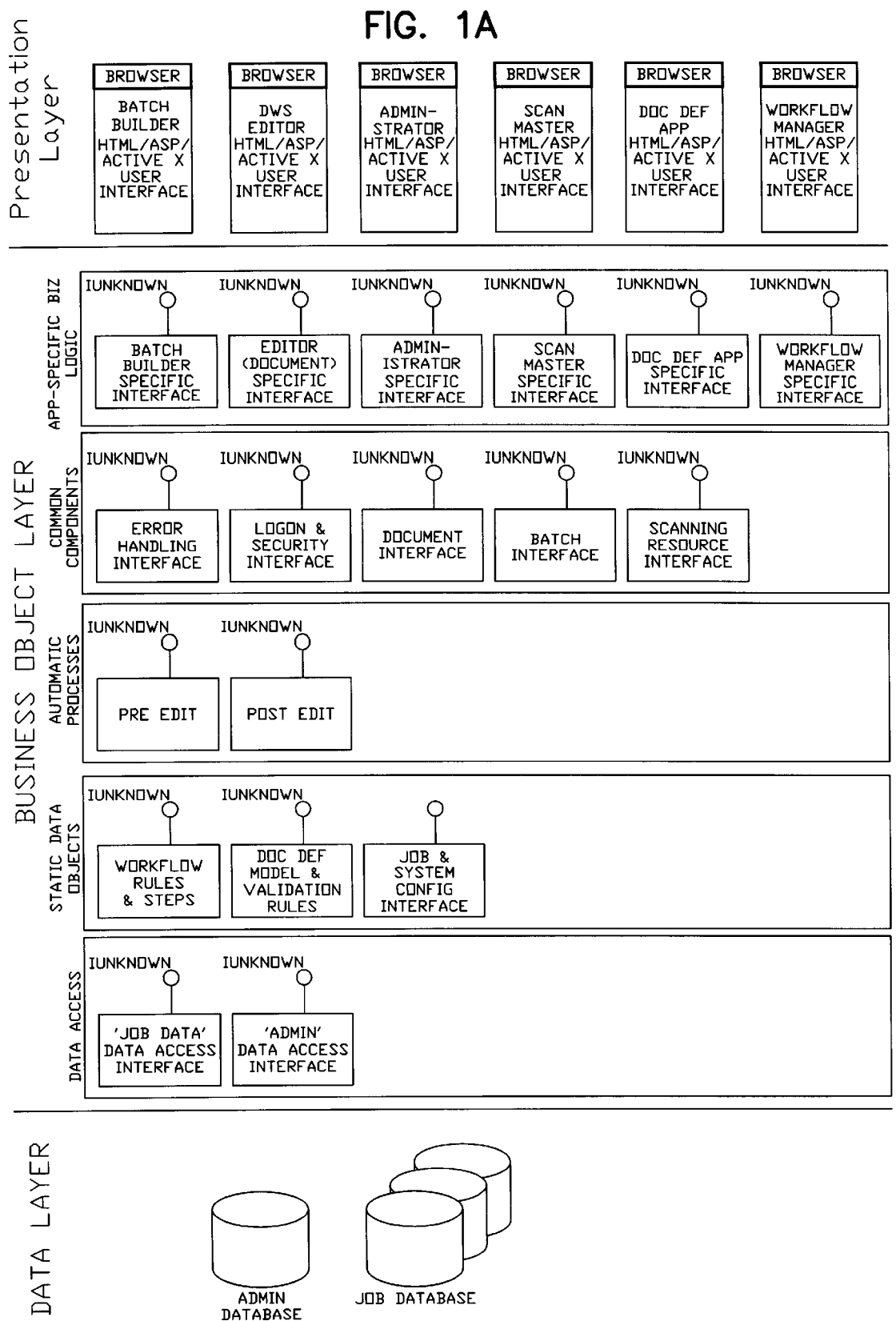
FIG. 1A is a three tier architecture view exemplary of the type used in the claimed inventions.

Although many programming languages and classes may be utilized to carry out the present inventions, one of the preferred embodiments uses object oriented programming. Object oriented programming includes writing programs in one of a class of programming languages and techniques based on the concept of an "object" which is a data structure encapsulated with a set of routines, called "methods" which operate on the data. (See FIG. 1A). Operations on the data can only be performed via these methods, which are common to all objects that are instances of a particular "class." Thus the interface to objects is well defined, and allows the code implementing the methods to be changed so long as the interface remains the same. For example, an IUnknown interface is shown in FIG. 1A. Each class is a separate module and has a position in a class hierarchy. Methods or code in one class can be passed down the hierarchy to a subclass or inherited from a superclass. Procedure calls are described in terms of message passing. A message names a method and may optionally include other arguments. When a message is sent to an object, the method is looked up in the object's class to find out how to perform that operation on the given object. If the method is not defined for the object's class, it is looked for in its superclass and so on up the class hierarchy until it is found or there is no higher superclass. Procedure calls always return a result object, which may be an error, as in the case where no superclass defines the requested method. FIG. 1A represents one overview of the object oriented programming structure of the present invention. Others object oriented programming structures are contemplated and utilized.

Figure 5:
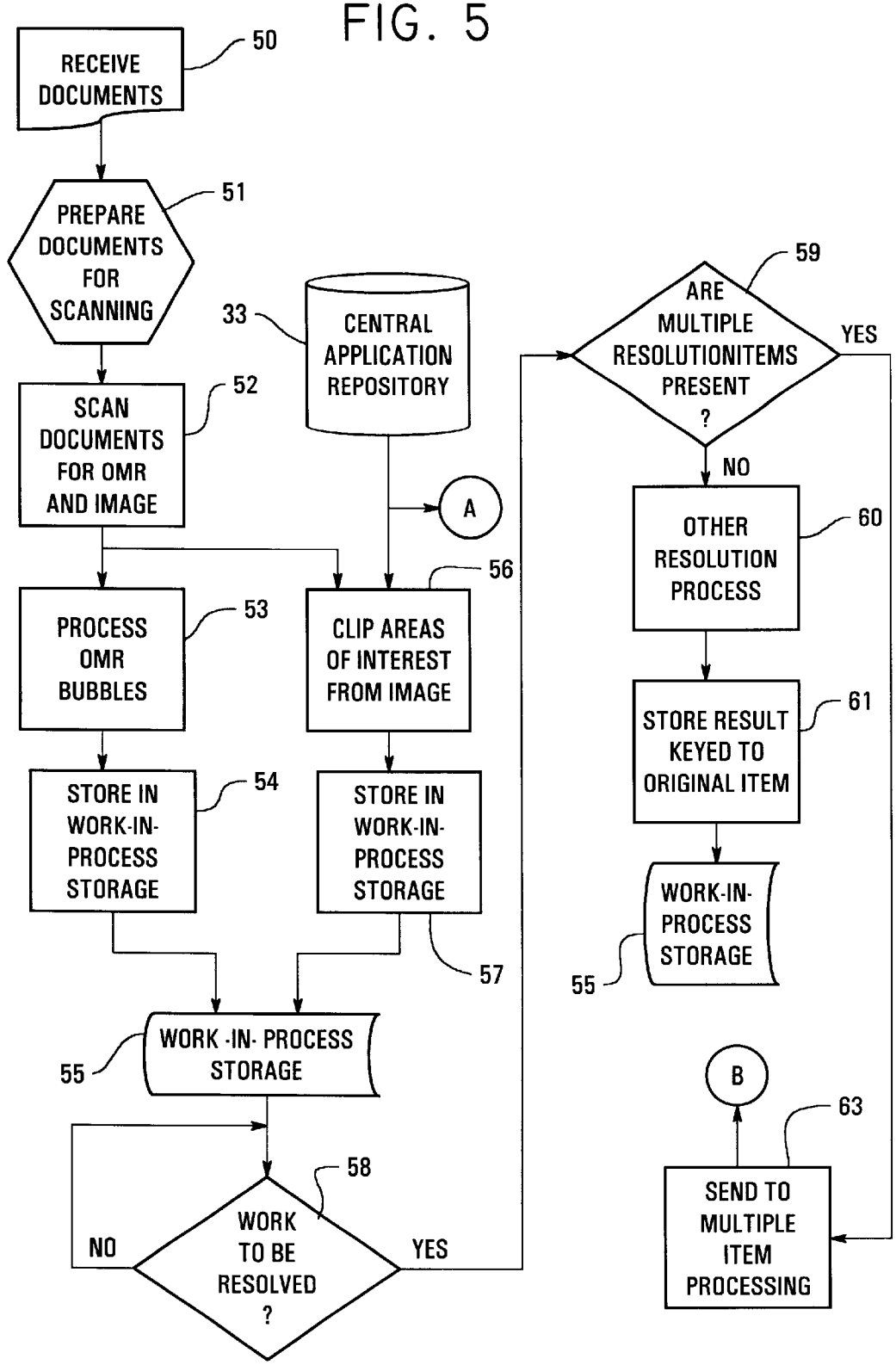
FIG. 5 is a flow chart of receiving and processing of response items.

FIG. 5 is a flowchart of a general overview of typical scanning and processing of response forms and responses. The document processing center receives the response sheets or other documents, at step 50 and performs initial clerical preparation of the documents at step 51 prior to scanning. For example, if the documents received include a digital identifier in the form of a bar code or other machine readable format, the digital identifier is read into the system using a barcode reader or other similar technology known to one skilled in the art. In an alternative embodiment, the documents received do not include a digital identifier. In the latter scenario, the receiver of the documents may manually organize the received documents into predefined groups or batches. Such batches are a collection of documents, or the electronic images and/or data derived from the documents, organized in some relational manner. For example, a university customer may request that all response sheets from freshman test takers comprise a batch separate from the response sheets from sophomores. Batches may include sub-batches. For example, the freshman batch may be further divided by the sex of the student/respondent.

The system at step 52 scans the documents comprising one batch or a sub-set of one batch. The system is designed to accommodate various types of optical imaging devices, as disclosed above. If the scanner is capable, the system may process the OMR bubbles at step 53, during scan time, and store the data derived from "reading" the OMR marks in the work-in-process storage (WIP) at step 54. The system at step 56 can "clip" areas of interest from the document, again during scan time, saving data derived from the image in the WIP 54. The clipped image is saved as an image file in server 10 or client computer 12. The step of "clipping" involves electronically copying a portion of the scanned image. This can be done at scan time using an intelligent scanner or later if a non-intelligent scanner is used. These "clipped" areas may comprise any portion of a response sheet; for example a handwritten essay, machine printed name or graphical response such as a mark or drawing. The system may also receive image data directly from foreign sources, magnetic or electronic, and store the data in raw item database 36. Subsequent operations on the data are the same regardless as to the source of the data. After "clipping" areas of interest from the image, the system stores the response items at step 57 in the WIP 54 or transfers the response items to the server 10 for storage.

The system can run on any computer using a standard operating system such as Microsoft Windows or NT. The server subsystem typically operates Microsoft Transaction Server (MTS) and Microsoft Internet Information Server (IIS 4.0) connecting through ActiveX Data Access Object (ADO) to connect to either MS SQL Server or MS Access (on NT Server) or Oracle (on NT or UNIX) for the database.

It has been found that if the scanner 27 coupled to the client subsystem is an intelligent scanner such as the NCS 5000I, the client computer PC runs well using Windows NT. For programming and support efficiency, a standard object oriented programming language such as C++, MFC or Visual Basic are recommended. However, one skilled in the art will appreciate that almost any programming language can be used to accomplish the present invention. It preferably is also part of the present software to utilize the Internet as well as private Intranets and the flexibility of browsers such as Netscape Navigator and Microsoft Internet Explorer.

Prior to providing the electronic images to human resolvers for online grading or analysis, steps 58–63, the system performs additional preparation processes, described in detail below, to ensure the identity of the image, the quality of the image to be presented, the relationship of the image to the original document from which it was imaged, the accuracy of data derived from the document imaged and the archival storage of the images for future use or reference or both.

Response Processing Workflow Tracking System and Method

Figures 1, 6:
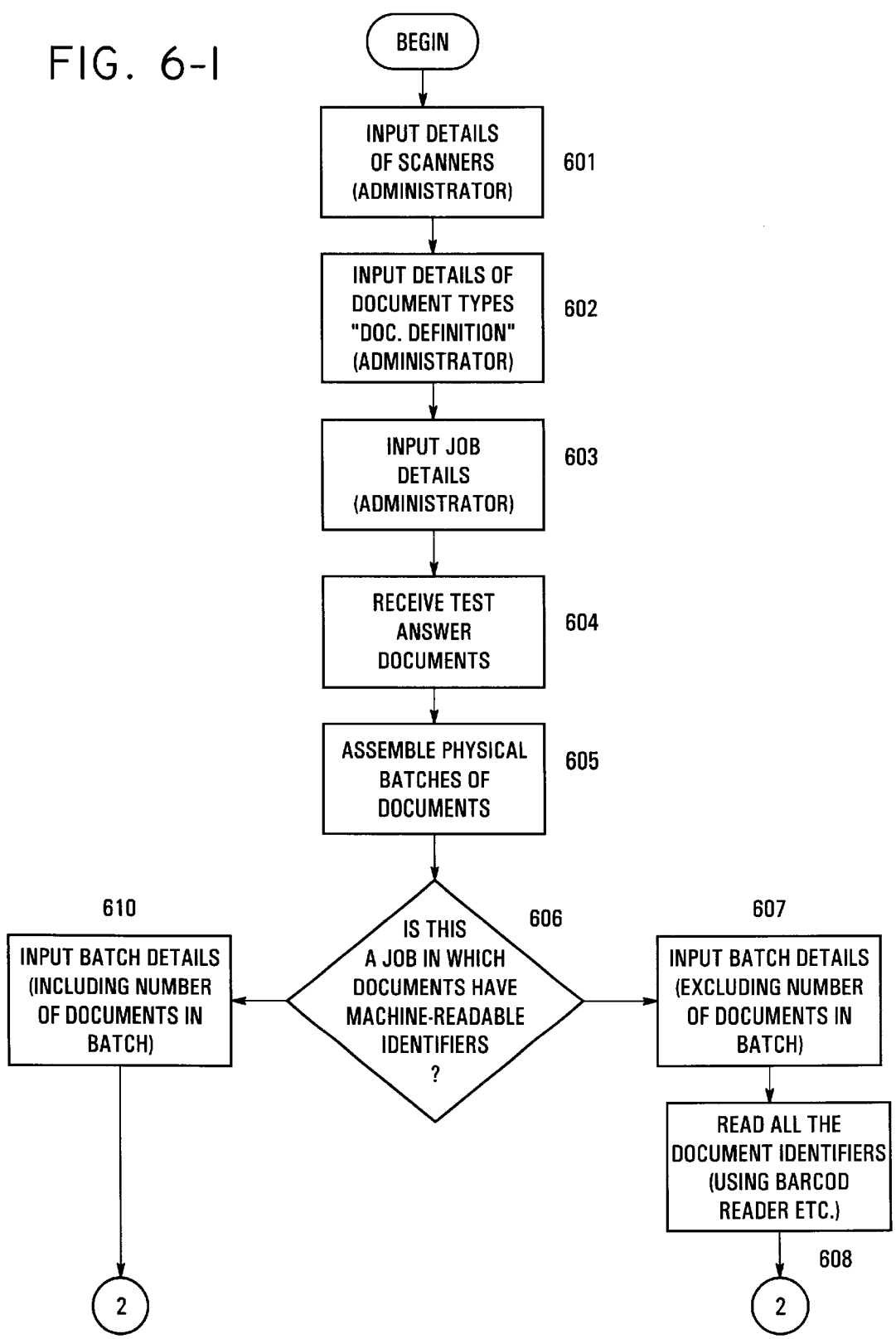
FIG. 6 is a flow chart of one embodiment of the workflow tracking invention.

FIG. 6 is a flowchart of a preferred embodiment of the response item workflow tracking and organization invention.

A human administrator, in steps 601, 602 and 603, inputs information into a system database via a user interface. In step 601, information about the optical imaging device(s) to be used in imaging the response documents is entered. Such information may include optical imaging device identifier and interface type. Information pertaining to the document types to be imaged is entered in step 602. Document information is preferably obtained by capturing an electronic image of a blank response form and a combination of commercially available and bespoke software to define document attributes such as regions of interest. In step 603 information specific to the particular job or project to be undertaken, including, but not limited to, a narrative about the customer, workflow rules, customer logic and machine readable identifier, is entered by the human administrator. The above steps can, but are not required to, occur before receipt of the response documents provided by respondents which occurs at 604.

The documents received, and to be imaged, are assembled by the human administrator, step 605, into batches or groups of a suitable size for processing consistent with the customer's needs. In an alternative, batches may be defined by the customer and if of a non-suitable size, may be divided into smaller sub-batches to facilitate imaging. In step 606, it is determined whether the documents received at the processing center include a machine readable identifier ("MRI"). A MRI may include a bar code or other similar machine readable number or code. If a MRI is included on the documents to be imaged, the administrator will input batch information into the system, step 607, excluding the number of documents in the batch. Batch information may include text including a batch name, an optional batch name provided by the customer and an optional narrative text string. Using a bar code "reader" or other similar device, the MRIs will be read and entered into the system database at step 608. In step 609, the documents are counted using the machine readable identifier and the number of documents to be imaged is stored in a system database. The system generates, at step 611, a unique bar-code batch identifier for each batch assembled and prints a batch header document that includes the unique bar-code batch identifier as well as the batch information described above.

If the documents do not include a machine readable identifier, step 610, a human administrator manually counts and inputs the number of documents in the batch to be imaged as well as the batch information described above. The system generates, at step 611, a unique bar-code batch identifier for each batch assembled and prints a batch header document that includes the unique bar-code batch identifier as well as the batch information described above.

In step 612, the documents are optically imaged using scanner, facsimile machine or other optical imaging device known to those skilled in the art. Scanners can be grouped in two general categories: intelligent and non-intelligent scanners. It is a significant aspect of the system and method described herein to be adaptable to a variety of optical imaging devices, including scanners. If an intelligent scanner, such as the NCS 5000i, is used to electronically image the documents, the system will "clip" data or images, step 613, from certain regions of interest on the response document. Preferably, only the data or response image is captured, and the response document background is not captured. More than one "clip" may be taken from a document. In step 613, one multiple image file containing all the image clips from one document is created. In one preferred embodiment, the images are in tag imaged file format (TIFF). A custom tag typically is utilized that contains an individual digital identifier (IDI) that uniquely identifies the image clip. The IDI contains the information about the image that the system requires for subsequent display in the correct context. Typical items included in the IDI are position coordinates and form identification. The system then stores any data derived from the image clips in a database, step 614. Storing the IDI in the tag of the image, rather than in an associated database, permits faster retrieval of the data when the image needs to be displayed. It has the added benefit of avoiding any risk of the image becoming separated from the relevant data.

If a non-intelligent scanner is used, the scanner typically produces an image file for each page of the document; one image per page side, step 615. Interpretation of the data typically is not performed by a non-intelligent scanner. In step 616, the image is stored in files, a separate directory is created for each batch of documents.

Pre-Data Collection Preparation of Responses

Figure 7:
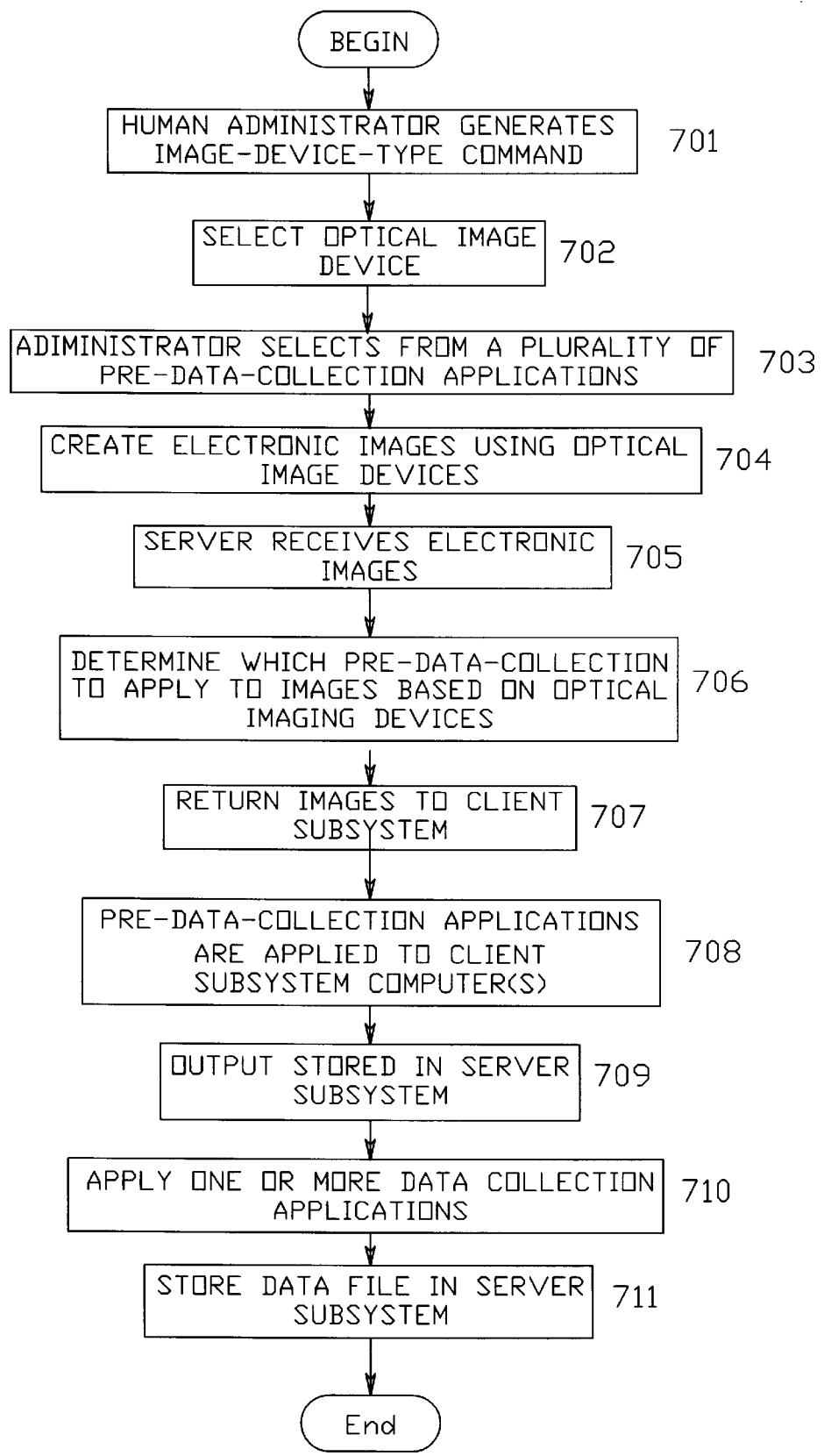
FIG. 7 is a flow chart of one embodiment of the pre-data-collection applications invention.

FIG. 7 is a flowchart of the preferred embodiment of the pre-data collection system and method applied to electronic images of responses in the processing workflow system. The pre-data-collection applications are used to effect various tasks upon the electronic images desired for subsequent data collection. For example, an electronic image of a response may require "cleaning" via commercially available software to improve the electronic image from which data will be captured. In step 701 a human administrator generates an image-device-type command informing the system of the type of optical imaging device to be used to create electronic images of the responses. Optical imaging devices include scanners, facsimile machines and other devices known to those skilled in the art that can convert an image into binary data. This preferred embodiment utilizes an optical imaging device that outputs binary data in a tagged image file format (TIFF). Upon selecting an optical imaging device type in step 702, the system receives a command informing it of the optical image device type to be used to electronically capture the test question responses as electronic images. The word "command" is meant in the broadest possible interpretation to include a character string that tells a program to perform a specific action or supply input information. Specifically, the word "command" includes menu items as commands.

In step 703, the human administrator is asked to select which of a number of pre-data-collection software applications are to be applied to the electronic images of test question responses. Pre-data-collection software includes any software application that may be applied to an electronic image. In the preferred embodiment, pre-data-collection software applications include software programs with the ability to recognize handwriting, software programs with the ability to red a barcode, software applications with the ability to identify an image as belonging to a particular set of images, and software applications with the ability to remove from electronic images noise and superfluous lines without removing characters, as well as other software applications know to those skilled in the art of digitizing an optical image into an electronic image represented as binary data. Upon selection of the same, the system is updated via a pre-data-collection command informing it of the pre-data-collection software applications to be applied.

In step 704, the system begins to receive electronic images of the test question responses via the optical imaging device. The output of the optical imaging device is binary data and preferably, binary data capable of storage in tagged image file format (TIFF). The electronic images of test question responses are received in the server subsystem at step 705. The system then determines which one or more of the plurality of pre-data-collection software applications to apply to the received electronic images based upon the optical-imaging-device-type-command and the pre-data-collection software command, step 706. In this described preferred embodiment, after determining which of the plurality of pre-data-collection software applications to apply to the electronic images, the received electronic images are returned to the client computer system at step 707. The selected pre-data-collection software applications are applied sequentially to the returned electronic images in step 708.

Typically, the output from applying one or more of the plurality of pre-data-collection software applications will be stored in the server subsystem, step 709. For example, an electronic image that has been cleaned of noise and superfluous lines without removing actual characters will be saved as an electronic image separate from the electronic image to which the pre-data-collection software application was applied. Similarly, the data returned from reading a barcode or identifying an image as belonging to a particular set of images would be saved in the server subsystem.

Following application of the pre-data-collection software programs, in step 710, one or more data collection software applications typically then are applied to the returned electronic images. Data collection software applications include intelligent character recognition, optical character recognition and other software applications that recognize printed or written characters by a computer. Such programs are well know to those skilled in the art of image processing and character recognition. The text file or other similar data generated from the application of data collection software is stored in the server subsystem at step 711.

In an alternative embodiment, the application of the pre-data-collection software program occurs in the server subsystem rather than the client computer system. Such an embodiment saves the step of returning the received electronic images to the client computer system; however, any benefit is offset by the usage of the server subsystem resources to apply the pre-data-collection software applications in the server subsystem.

Test Question Response Verification System and Method

Figure 8A:
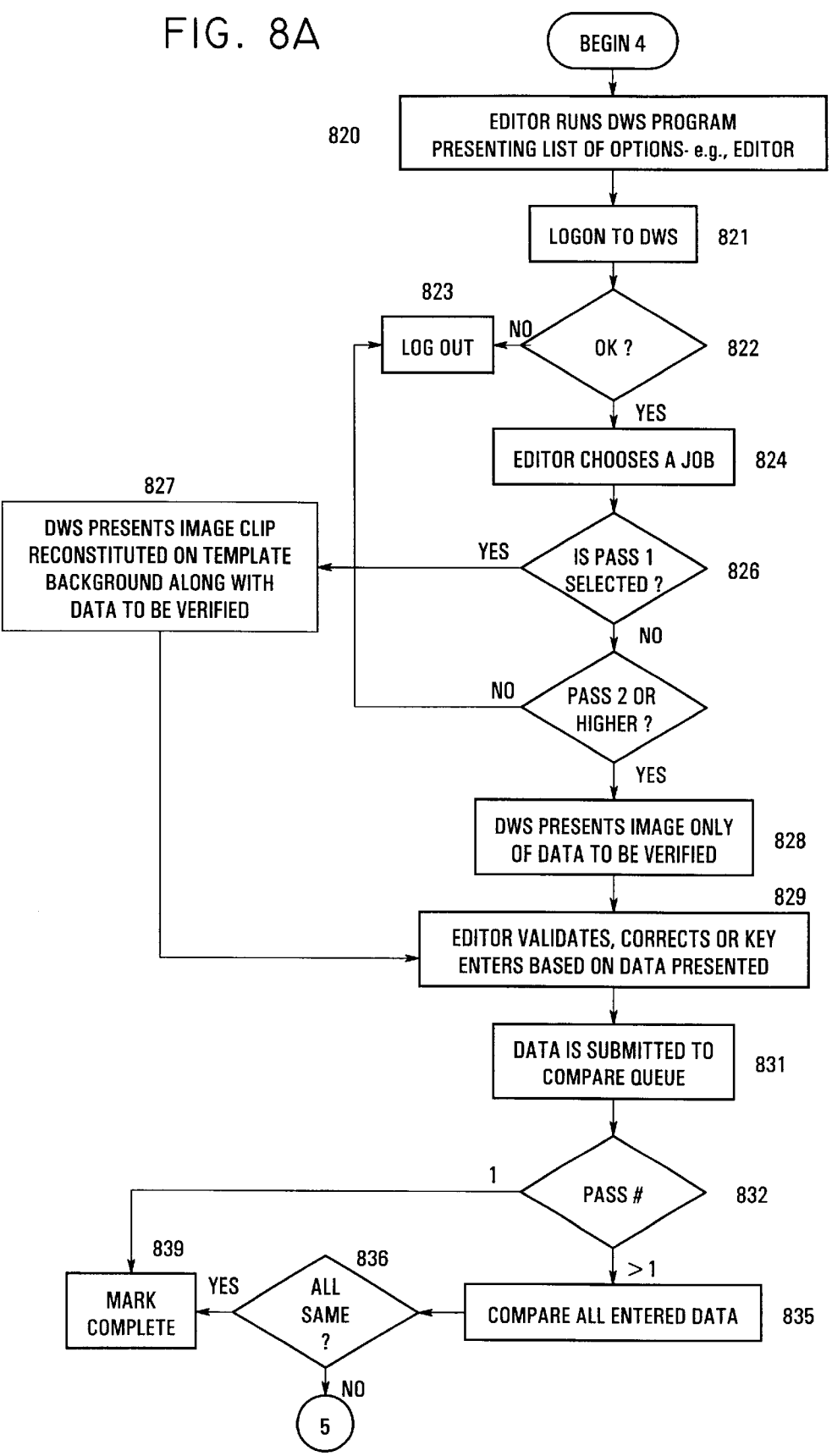
Figure 8B:
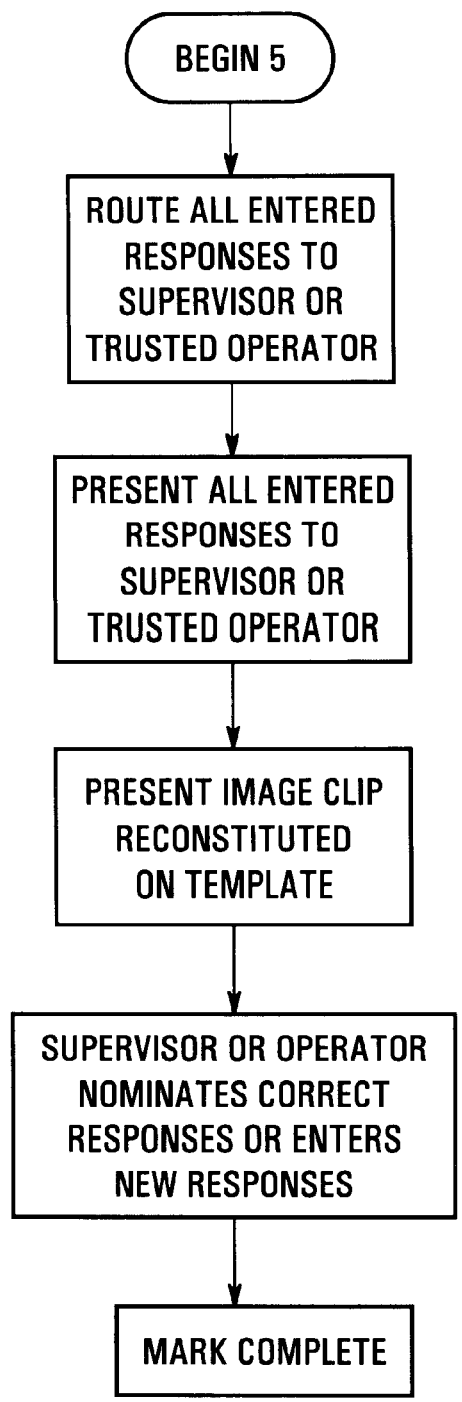

FIGS. 8 and 8A are flowcharts of one preferred embodiment of a test question response verification system and method. Typically electronic images of test question responses can be divided into image clips, where an image clip is an electronic image smaller than a full-page image. Data is then typically converted from a binary representation of the image clip using image recognition techniques such as intelligent character recognition, optical character recognition or other character recognition and image processing programs know to those skilled in the art. As recognized by those skilled in the art, character recognition involves complex image processing algorithms and rarely achieves 100 percent accuracy. Accordingly proofreading or verification is recommended.

The system at steps 801 and 802 determines if data derived from electronic images having undergone character recognition requires verification. At step 803, the system has determined that verification is needed and contemporaneously determines how many times each item must be independently verified. Typically a human administrator predetermines the number of independent verifications any data requires. The system can be programmed to apply one or more verification passes to particular items. Each verification pass is an independent verification of the accuracy of the data converted from an electronic image. If only one verification pass is to be carried out, the system retrieves the data to be verified from the server subsystem at step 804 and makes the data available in a work queue at step 809.

If more than one verification pass is required, in addition to retrieving the data to be verified and placing the same in a work queue at steps 804 and 809, the system creates an empty field for each verification pass greater than one at step 805. For example, if three verification passes are required of a particular item, the system will create two empty fields for verification passes 2 and 3. The system then retrieves an image of the information at step 806 that was converted into data at step 804. The system sends the images to work queues, one queue per each verification pass at step 809. The system then holds the data and images in work queues at step 809 until an editor logs into the server subsystem.

Step 820 of the system provides to a human editor a list of options available from which to select using a graphical user interface. One of the selections available includes verification. The human editor logs on to the system at step 821. At step 822 the system determines if the login procedure has been complied with by the human editor. If not, at step 823, the human editor is logged out of the system. If the login is accepted, at step 824, the editor is presented with a choice of particular editing jobs from which to select. A job, for example, may be a particular set of tests or surveys or questionnaires provided to NCS for processing. The jobs presented to the human editor are limited to those matching information known with the particular human editor. Once the particular job is selected, the system processes information related to each image clip against information pertaining to the particular skills of the human editor. In step 826, the system determines whether the human editor will be verifying an item undergoing only one pass of verification at step 826. If the item is only undergoing one pass of verification, at step 827, the system presents to the human editor selected image clips recompiled into coherent image portions such that the human editor sees on his or her computer monitor the complete background of a test form but only the selected images clips corresponding to material necessary for verification, typically the selected image clip and the corresponding data.

If the human editor is verifying an item undergoing more than one verification pass, the system at step 828 presents an image clip and its background, but not any derived text. The human editor then records a decision based on his or her observation of the accuracy of the material presented in step 829.

In step 831 the data verified is submitted to a compare queue. The system determines the number of verification passes the data underwent at step 832. If the data was subject to only one verification pass, then there is nothing with which to compare it and the data is marked complete at step 839. If however the data was subject to more than one verification pass, then all the decisions entered by the human editors in step 829 are compared in step 835. In step 836, the system determines if all the decisions entered by the human editors are the same, and if they are the same the data is marked complete at step 839. If however, the system determines that all the decisions entered by the human editors are not the same at step 836, the system routes all entered decisions to an adjudication process.

Multiple Server Processing Workflow System and Method

Figure 9A:
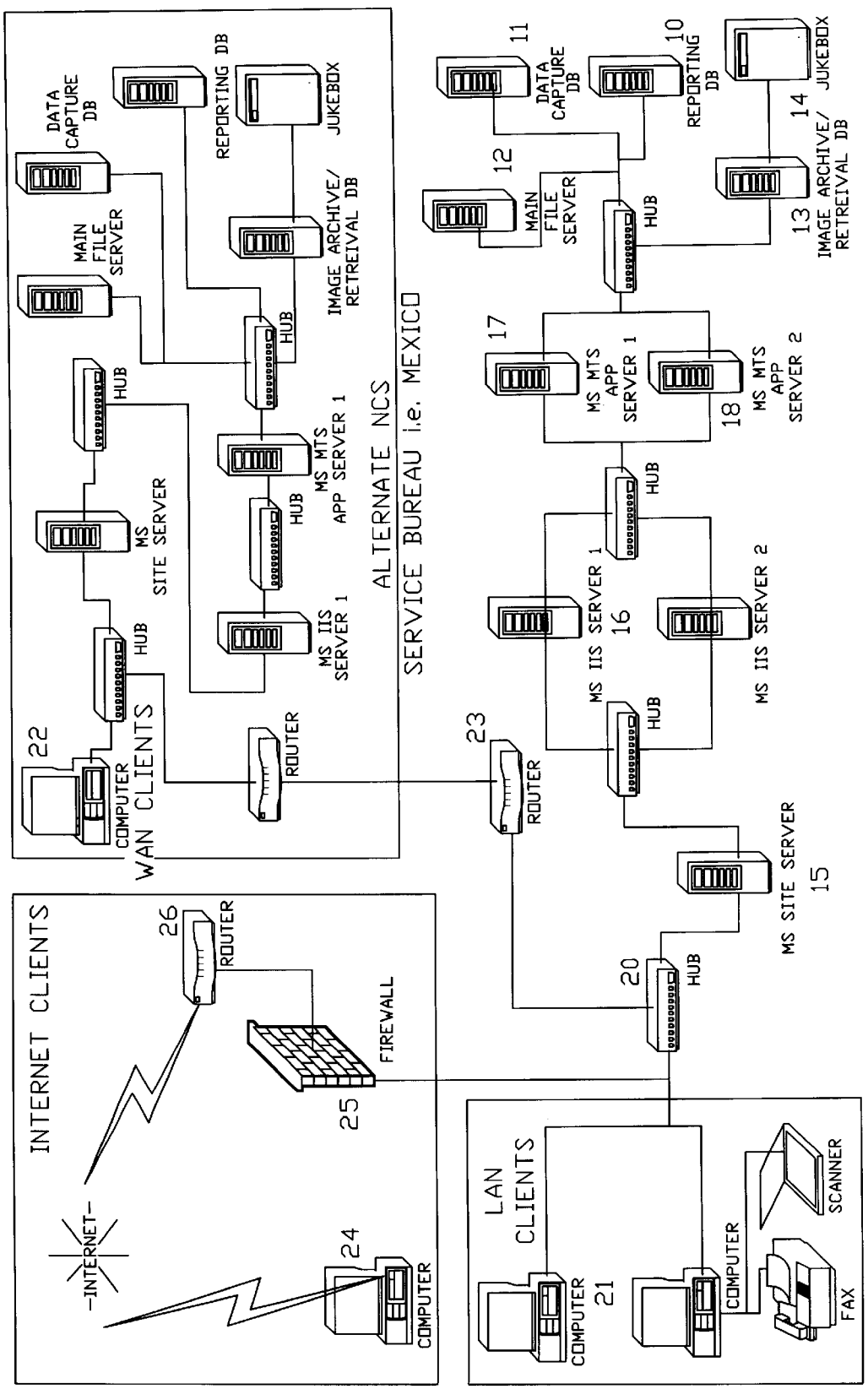
FIG. 9A is a block diagram of one embodiment of the multiple server response processing invention.

FIG. 9 is a flowchart that describes the multiple server test processing workflow system and method. At step 901 documents containing test question responses are optically imaged. The optically imaged test question responses are received by a server computer, at step 902, coupled to the client computer system that includes the optical imaging device. In an alternative embodiment, the server or servers that receive the optically imaged test question responses may not be the server computer coupled to the client computer that includes the optical imaging device. The receiving server computer may or may not store electronic images. In step 903 the system distributes from the receiving server computer to at least a second one of the plurality of server computers all or a portion of the received electronic images. The server computer or computers to which the received electronic images are distributed may or may not store the electronic images. In step 904 the electronic images are analyzed in one or more of the receiving server computers. It is further contemplated that the analysis step may occur not only in one of or all of the server computers but also may occur in one of or all of the client computers coupled to a particular server computer. The computer or computers which perform the analysis of the electronic images may return to the work flow system results for collation with other test question response analysis results, see step 905.

In an alternative embodiment, the receiving server computers are configured to analyze particular test response subject matter including particular human languages or particular fields of study such as math, science or subjects that may benefit from test processing personnel having particular skills related to the subject matters.

Archiving Electronic Images of Responses

FIG. 10 is a flowchart of the preferred embodiment of the test workflow image archive invention. In step 1001, an optical image of the test form template is created and stored in the server subsystem. In step 1002, the optical imaging device "clips" selected portions of a test question response from a test taken by a test taker generating an electronic representations of the test question responses. Typically, the output of the optical imaging device is in tagged image file format (TIFF); however, other formats may be used such as JPEG, BMP, etc. In step 1003, the server subsystem coupled to the optical imaging device receives the electronic representation of the test question responses and stores the same.

Typically, the electronic representations of the test question responses are saved on a magnetic medium such as a computer disk, magnetic tape or other storage medium known those skilled in the art. To minimize the use of expensive archival resources, the test form template and electronic representation of test question responses are transferred to an archival storage medium and stored separately, step 1004. The archival storage media includes magneto-optical disks, optical disks and other storage media know to those in the art as suitable for archiving electronic images. An electronic index is generated in step 1005, where the index links the test form template to the electronic representations of electronic images—now both stored on the archival medium. The index is typically a relational database that allows the definition of data structures, storage and retrieval operations and integrity constraints. In such a database the data and relations between them are organized in tables. A table is a collection of records and each record in a table contains the same fields. Certain fields may be designated as keys, which means that searches for specific values of that field will use indexing to speed them up. The fields typically correspond to fields selected by a human operator to correspond with particular areas of interest in the test.

When a user selects one of the archived items listed on the electronic index, step 1006, the server subsystem electronically creates at display time to the user an integrated electronic representation of the completed test, step 1006, prepared by the test taker by recompiling electronically the electronic representation of the test form template with the electronic images of the segregated test question responses. The user is then able to observer an electronic representation of the test taken by the test taker, typically on a computer monitor.

In an alternate embodiment, the recompiling electronically of the electronic representation of the test form template with the electronic images of the segregated test question responses occurs prior to storage on the archival medium, step 1015. In step 1016, the recompilation step is often accomplished in the same server in which the electronic images of the segregated test question responses and test form template are stored. Optionally, recompilation occurs in a different server computer or even in a client subsystem. An image compression algorithm, such as JPEG, can be applied to the recompiled integrated electronic representation of the completed test prepared by the test taker, step 1017. The integrated electronic representation of the completed test prepared by the test taker is then stored, step 1018, in a storage media suitable for archival purposes such as magneto-optical disks, optical disks and other storage media known to those in the art. An electronic index is generated in step 1019, where the electronic index can access the integrated electronic representation of the completed test stored on the archival medium. The index is typically a relational database as described above.

When a user selects one of the electronic index selections, step 1020, the integrated electronic representation of the completed test is accessed and may be presented to a human observer using a computer monitor. A browser installed on the computer coupled to the monitor viewed by the human observer will be able to display integrated electronic representation of the completed test and facilitate navigation from one page to the next if the test has multiple pages.

What is claimed is:

1. In a computerized test processing workflow system configured for analyzing electronic images of test question responses provided by a test taker, the system comprising a server subsystem having at least one server computer and a client subsystem having one or more client computers used by human editors located at the client computers, each human editor having particular skills for examining particular test portion subject matter, a method for enhancing the speed and accuracy of data within the workflow system in order to effect productive use of geographically-distributed human editors having particular appropriate skills, the method comprising:

a. selecting from each electronic image of test question responses at least one image clip;
   b. applying image recognition to generate data electronically from the at least one image clip;
   c. determining whether verification is needed of the data derived from the at least one image clip;
   d. matching image clip information to the particular skills of the human editors in order to select human editors having the particular appropriate skills;
   e. recompiling selected image clips into coherent image portions of the test question responses; and
   f. selectively presenting the coherent image portions to appropriate human editors located at the remote locations;
      whereby, through the transfer of the recompiled coherent image portions to appropriate human editors, widely-distributed human editors of greatly varying skills can be effectively used at the remote locations without the inefficiency of transferring relatively-large, unclipped electronic images of test question responses.

2. The method of claim 1 further comprising the step of analyzing through observation by an appropriate human editor the portion of the response disclosed by the coherent image portions.

3. The method of claim 2 further comprising the step of electronically recording a decision as to the human editors analysis, the decision being generated by the selected human editor for each distributed coherent image portion.

4. The method of claim 2, wherein the step of analyzing the coherent image portions through observation further comprises determining whether the coherent image portion presented matches particular data simultaneously presented to the human editor with the coherent image portion.

5. The method of claim 2, wherein the step of analyzing the coherent image portions through observation further comprises reaching a decision as to what the portion of the response disclosed by the coherent image portion represents.

6. The method of claim 1, wherein the step of applying image recognition to the at least one image clip comprises applying image character recognition or optical character recognition.

7. The method of claim 1, wherein the step of matching image clip information to the particular skills of the human editors further comprises matching the particular test subject matter of the test question with the particular subject matter skills of the human editor.

8. The method of claim 1, wherein the step of matching image clip information to the particular skills of the human editors further comprises using a bit mask of up to 32 bits in which to store information related to each image clip.

9. The method of claim 1 wherein, following the step of selecting at least one image clip from the electronic images of test question responses, the method further comprises:

a. electronically assigning an individual digital identifier to each of the image clips, wherein each individual digital identifier represents at least a portion of information related to the test taker or the test;

b. the step of matching image clip information to the particular skills of the human editors comprises processing the individual digital identifiers related to each coherent image portion against the particular skills of the human editors;

whereby, through the transfer of the recompiled image portions tagged with the digital codes to appropriate human editors, widely-distributed human editors of greatly varying skills can be effectively used at the remote locations without the inefficiency of transferring relatively-large, unclipped electronic images of test question responses.

10. The method of claim 1, further comprising the following steps:
   a. recompiling again selected image clips already viewed by appropriate human editors into coherent image portions of the test question response;
   b. selectively presenting the coherent image portions to appropriate human editors located at the remote locations but not to the same human editors who previously viewed the coherent image portions; and
   c. electronically recording at least one entry generated by the appropriate human editor for each presented coherent image portion.

11. In a computerized test processing workflow system configured for analyzing electronic images of test question responses provided by a test taker, the system comprising a server subsystem having at least one server computer and a client subsystem having one or more client computers used by human editors located at the client computers, each human editor having particular skills for examining particular test portion subject matter, a method for enhancing the speed and accuracy of data within the workflow system in order to effect productive use of geographically-distributed human editors having particular appropriate skills, the method comprising:
   a. selecting from each electronic image of test question responses at least one image clip;
   b. applying image recognition to generate data electronically from the at least one image clip;
   c. determining whether verification is needed of the data derived from the at least one image clip;
   d. matching image clip information to the particular skills of the human editors in order to select human editors having the particular appropriate skills;
   e. recompiling selected image clips into coherent image portions of the test question responses;
   f. selectively presenting the coherent image portions to appropriate human editors located at the remote locations;
   g. analyzing through observation by an appropriate human editor the portion of the response disclosed by the coherent image portions;
   h. electronically recording a decision as to the human editors analysis, the decision being generated by the selected human editor for each distributed coherent image portion;
   whereby, through the transfer of the recompiled coherent image portions to appropriate human editors, widely-distributed human editors of greatly varying skills can be effectively used at the remote locations without the inefficiency of transferring relatively-large, unclipped electronic images of test question responses.

12. In a computerized test processing workflow system configured for analyzing electronic images of test question responses provided by a test taker, the system comprising a server subsystem having at least one server computer and a client subsystem having one or more client computers used by human editors located at the client computers, each human editor having particular skills for examining particular test portion subject matter, a method for enhancing the speed and accuracy of data within the workflow system in order to effect productive use of geographically-distributed human editors having particular appropriate skills, the method comprising:
   a. selecting from each electronic image of test question responses at least one image clip;
   b. electronically assigning an individual digital identifier to each of the image clips, wherein each individual digital identifier represents at least a portion of information related to the test taker or the test;
   c. applying image recognition to generate data electronically from the at least one image clip;
   d. determining whether verification is needed of the data derived from the at least one image clip;
   e. processing the individual digital identifier related to each image clip against the particular skills of the human editors in order to select human editors having the particular appropriate skills;
   f. recompiling selected image clips into coherent image portions of the test question response;
   g. selectively presenting the coherent image portions to appropriate human editors located at the remote locations;
   h. analyzing through observation by an appropriate human editor the portion of the response disclosed by the coherent image portions;
   i. electronically recording a decision verifying the particular data, the decision being generated by the selected human editor for each distributed coherent image portion;
   whereby, through the transfer of the recompiled coherent image portions tagged with the digital codes to appropriate human editors, widely-distributed human editors of greatly varying skills can be effectively used at the remote locations without the inefficiency of transferring for viewing relatively-large, unclipped electronic images of test question responses.

13. The method of claim 12, wherein the step of analyzing through observation includes determining whether the coherent image portion presented matches the particular data, also presented, electronically created from the image clips that form the coherent image portion.

14. The method of claim 12, wherein the step of analyzing through observation includes reaching a decision as to what the portion of the response disclosed by the coherent image portion represents.

15. A system for improving the productive use of geographically-distributed human editors having particular appropriate skills by enhancing the speed and accuracy of data within a computerized test processing workflow system configured for analyzing electronic images of test question responses provided by a test taker, the system comprising
   a. a server subsystem having at least one server computer;
   b. a client subsystem having at least one client computer used by human editors located at the client computers and coupled to the server subsystem;
   c. the at least one client computer configured for selecting from each electronic image of test question responses at least one image clip;

d. the at least one client computer configured to apply image recognition to generate data electronically from the at least one image clip;

e. the at least one server computer configured to match image clip information to the particular skills of the human editors in order to select human editors having the particular appropriate skills;

f. the at least one server computer configured to recompile selected image clips into coherent image portions of the test question responses; and g. the at least one client computer configured to selectively present the coherent image portions to appropriate human editors located at the remote locations.

16. The system of claim 15, further comprising the client subsystem configured to facilitate analyzing through observation by an appropriate human editor the portion of the response disclosed by the coherent image portions.

17. The system of claim 15, further comprising the client subsystem configured to facilitate electronically recording a decision verifying the particular data, the decision being generated by the selected human editor for each distributed coherent image portion.

18. The system of claim 15, further comprising the server subsystem configured to electronically assign an individual digital identifier to each of the image clips, wherein each individual digital identifier represents at least a portion of information related to the test taker or the test.

19. The system of claim 18, further comprising the server subsystem configured to process the individual digital identifier related to each image clip against the particular skills of the human editors in order to select human editors having the particular appropriate skills.

20. The system of claim 15, further comprising the server subsystem configured to:

a. recompile again selected image clips already viewed by appropriate human editors into coherent image portions of the test question response;

b. selectively present the coherent image portions to appropriate human editors located at the remote locations but not to the same human editors who previously viewed the coherent image portions; and c. electronically record at least one entry generated by the appropriate human editor for each presented coherent image portion.

21. A computer program product readable by a computing system for a computer process for a computerized test processing workflow system configured for analyzing electronic images of test question responses provided by a test taker, the system comprising a server subsystem having at least one server computer and a client subsystem having one or more client computers used by human editors located at the client computers, each human editor having particular skills for examining particular test portion subject matter, a method for enhancing the speed and accuracy of data within the workflow system in order to effect productive use of geographically-distributed human editors having particular appropriate skills, the computer program product comprising encoded instructions either embedded on a computer-readable media or transmitted in a propagating wave, the encoded instructions being arranged and configured to be read by the computing system for causing the computing system to perform the steps of:

a. selecting from each electronic image of test question responses at least one image clip;

b. applying image recognition to generate data electronically from the at least one image clip;

c. determining whether verification is needed of the data derived from the at least one image clip;

d. matching image clip information to the particular skills of the human editors in order to select human editors having the particular appropriate skills;

e. recompiling selected image clips into coherent image portions of the test question responses; and f. selectively presenting the coherent image portions to appropriate human editors located at the remote locations;

whereby, through the transfer of the recompiled coherent image portions to appropriate human editors, widely-distributed human editors of greatly varying skills can be effectively used at the remote locations without the inefficiency of transferring relatively-large, unclipped electronic images of test question responses.

22. A computer program product readable by a computing system for a computer process for a computerized test processing workflow system configured for analyzing electronic images of test question responses provided by a test taker, the system comprising a server subsystem having at least one server computer and a client subsystem having one or more client computers used by human editors located at the client computers, each human editor having particular skills for examining particular test portion subject matter, a method for enhancing the speed and accuracy of data within the workflow system in order to effect productive use of geographically-distributed human editors having particular appropriate skills, the computer program product comprising encoded instructions either embedded on a computer-readable media or transmitted in a propagating wave, the encoded instructions being arranged and configured to be read by the computing system for causing the computing system to perform the steps of:

a. selecting from each electronic image of test question responses at least one image clip;

b. applying image recognition to generate data electronically from the at least one image clip;

c. determining whether verification is needed of the data derived from the at least one image clip;

d. matching image clip information to the particular skills of the human editors in order to select human editors having the particular appropriate skills;

e. recompiling selected image clips into coherent image portions of the test question responses;

f. selectively presenting the coherent image portions to appropriate human editors located at the remote locations;

g. analyzing through observation by an appropriate human editor the portion of the response disclosed by the coherent image portions;

h. electronically recording a decision as to the human editors analysis, the decision being generated by the selected human editor for each distributed coherent image portion;

whereby, through the transfer of the recompiled coherent image portions to appropriate human editors, widely-distributed human editors of greatly varying skills can be effectively used at the remote locations without the inefficiency of transferring relatively-large, unclipped electronic images of test question responses.

23. A system for improving the productive use of geographically-distributed human editors having particular appropriate skills by enhancing the speed and accuracy of data within a computerized test processing workflow system configured for analyzing electronic images of test question responses provided by a test taker, the system comprising:

a. means for selecting from each electronic image of test question responses at least one image clip;
 b. means for applying image recognition to generate data electronically from the at least one image clip;
 c. means for matching image clip information to the particular skills of the human editors in order to select human editors having the particular appropriate skills;
 d. means for recompiling selected image clips into coherent image portions of the test question responses; and
 e. means for present the coherent image portions to appropriate human editors located at the remote locations.

\* \* \* \* \*